(12) United States Patent
Yamaguchi et al.

(10) Patent No.: US 8,097,552 B2
(45) Date of Patent: Jan. 17, 2012

(54) DIELECTRIC CERAMICS AND CAPACITOR

(75) Inventors: Katsuyoshi Yamaguchi, Kagoshima (JP); Masahiro Nishigaki, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 309 days.

(21) Appl. No.: 12/559,360

(22) Filed: Sep. 14, 2009

(65) Prior Publication Data

US 2010/0002360 A1    Jan. 7, 2010

Related U.S. Application Data

(63) Continuation-in-part of application No. PCT/JP2008/054080, filed on Mar. 6, 2008.

(30) Foreign Application Priority Data

| Mar. 16, 2007 | (JP) | ................................ 2007-068613 |
| Mar. 23, 2007 | (JP) | ................................ 2007-076136 |
| Mar. 23, 2007 | (JP) | ................................ 2007-076137 |

(51) Int. Cl.
    *C04B 35/468*    (2006.01)
(52) U.S. Cl. ...................... 501/139; 501/138; 361/321.4
(58) Field of Classification Search .................. 501/138, 501/139; 361/321.4
    See application file for complete search history.

(56) References Cited

U.S. PATENT DOCUMENTS 6,746,980 B2 *    6/2004    Tokita et al. .................. 501/137

FOREIGN PATENT DOCUMENTS

| JP | 51-149599 A | 12/1976 |
| JP | 06-028920 A | 2/1994 |
| JP | 09-012359 A | 1/1997 |
| JP | 2001-089231 A | 4/2001 |
| JP | 2001-294481 A | 10/2001 |
| JP | 2005-112719 A | 4/2005 |
| JP | 2006-036606 A | 2/2006 |
| JP | 2007-055835 A | 3/2007 |

* cited by examiner

*Primary Examiner* — Karl Group
(74) *Attorney, Agent, or Firm* — Birch, Stewart, Kolasch & Birch, LLP

(57) ABSTRACT

A dielectric ceramic and a capacitor comprising the dielectric ceramic are disclosed. The dielectric ceramic has a high dielectric constant that is stable over temperature, and has a small spontaneous polarization. The capacitor can reduce audible noise caused by an electrically induced strain in a power supply circuit.

20 Claims, 6 Drawing Sheets

DIELECTRIC CERAMICS AND CAPACITOR

CROSS-REFERENCE TO RELATED APPLICATION

The present application is a continuation in part based on PCT application No. JP2008/054080, filed on Mar. 6, 2008 which claims the benefit of Japanese Patent Applications No. 2007-068613, filed on Mar. 16, 2007, No. 2007-076136, filed on Mar. 23, 2007, and No. 2007-076137, filed on Mar. 23, 2007, all entitled "DIELECTRIC CERAMIC AND CAPACITOR," the contents of which are incorporated by reference herein in their entirety.

FIELD OF THE INVENTION

Embodiments of the present invention relate generally to dielectric ceramics and capacitors, and more particularly relate to dielectric ceramics containing barium titanate as a main component and a capacitor including the dielectric ceramic.

BACKGROUND

Digital electronic devices such as mobile computers and cellular phones are now widely used. Digital terrestrial broadcasting is also now in use. Receivers for digital terrestrial broadcasting are digital electronic devices such as a liquid crystal display (LCD) and plasma display. Such digital electronic devices include many large scale integrated circuits (LSI's).

Power circuits of such digital electronic devices include capacitors for bypassing. In practice, most digital circuits such as microcontroller circuits are designed as direct current (DC) circuits. Variations in the voltages of these circuits can cause problems, for example, if the voltages swing too much, the circuit may operate incorrectly. For most practical purposes, a voltage that fluctuates is considered an AC component. A function of a bypass capacitor is to dampen the AC component, which can be considered to be electrical noise. Another term used for the bypass capacitor is a filter cap.

A multilayer ceramic capacitor, which comprises a dielectric ceramic having a high relative dielectric constant, is used when a high capacitance is required in a circuit. On the other hand, a temperature compensating multilayer ceramic capacitor is used when a temperature characteristic of a capacitance is important in the circuit. The temperature compensating multilayer ceramic capacitor includes a dielectric ceramic with a stable temperature characteristic of the capacitance.

A multilayer ceramic capacitor with a high relative dielectric constant comprises a dielectric layer which has a ferroelectric property. Therefore, in a multilayer ceramic capacitor without temperature compensation a rate of change in temperature of the relative dielectric constant is high, thereby causing high hysteresis in electric-field versus dielectric polarization. Consequently, audible noise sounds tend to be easily generated on a power supply circuit due to an electrically induced strain.

In a temperature-compensating type multilayer ceramic capacitor, the dielectric layer has a paraelectric property. Therefore, the hysteresis in electric-field versus dielectric polarization characteristic is low. Thereby, the temperature-compensating type multilayer ceramic capacitor is substantially free from the electrically induced strain inherent to the ferroelectric property. However, since the dielectric ceramic in the temperature-compensating type multilayer ceramic capacitor has a low relative dielectric constant, its accumulating capability is low, which can cause degradation of its performances as a bypass capacitor.

Therefore, there is a need for a dielectric ceramic that has a high relative dielectric constant that is stable over temperature (has a stable temperature characteristic).

SUMMARY

A dielectric ceramic and a capacitor comprising the dielectric ceramic are disclosed. The dielectric ceramic has a high dielectric constant that is stable over temperature, and has a small spontaneous polarization. The capacitor can reduce audible noise caused by an electrically induced strain in a power supply circuit.

A first embodiment comprises a dielectric ceramic. The dielectric ceramic comprises a barium titanate; magnesium where a molar ratio of the magnesium to the barium is in a range of 0.01 to 0.06; yttrium where a molar ratio of the yttrium to the barium is in a range of 0.0014 to 0.06; and manganese where a molar ratio of the manganese to the barium is in a range of 0.0002 to 0.03. The dialectic ceramic also comprises tantalum where mass ratio of the tantalum to the barium titanate is in a range of 10.4 to 26.1 parts by mass of $Ta_2O_5$ with respect to 100 parts by mass of the barium titanate. The dielectric ceramic also comprises crystal grains comprising the barium titanate as a main component, where grain boundaries of the crystal grains are located between or among the crystal grains. Average diameter of the crystal grains is in a range of 0.05 μm to 0.2 μm.

A second embodiment comprises a capacitor. The capacitor comprises a dielectric ceramic comprising: a barium titanate; magnesium where a molar ratio of the magnesium to the barium is in a range of 0.01 to 0.06; yttrium where a molar ratio of the yttrium to the barium is in a range of 0.0014 to 0.06; and manganese where a molar ratio of the manganese to the barium is in a range of 0.0002 to 0.03. The dialectic ceramic also comprises tantalum where a mass ratio of the tantalum to the barium titanate is in a range of 10.4 to 26.1 parts by mass of $Ta_2O_5$ with respect to 100 parts by mass of the barium titanate. The dielectric ceramic also comprises crystal grains comprising the barium titanate as a main component; grain boundaries of the crystal grains are located between or among the crystal grains. Average diameter of the crystal grains is in a range of 0.05 μm to 0.2 μm. The capacitor also comprises a laminated body comprising dielectric layers and conductor layers, where each of the dielectric layers comprises the dielectric ceramic.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, a capacitor for a power supply circuit. Embodiments of the invention, however, are not limited to such lighting applications, and the techniques described herein may also be utilized in other optical applications. For example, embodiments may be applicable to a capacitor used to dampen the AC, or the noise in an electric circuit, and the like.

As would be apparent to one of ordinary skill in the art after reading this description, these are merely examples, and the embodiments of the invention are not limited to operating in accordance with these examples. Other embodiments may be utilized and structural changes may be made without departing from the scope of the exemplary embodiments of the present invention.

The dielectric ceramic according to the present embodiment contains barium titanate as a main component, magnesium, yttrium, manganese and tantalum. Molar ratios of the magnesium, the yttrium and the manganese in the dielectric ceramic, with respect to barium included in the dielectric ceramic, are set to 0.01 to 0.06 of the magnesium, 0.0014 to 0.06 of the yttrium and 0.0002 to 0.03 of the manganese. That is, the molar ratio of the yttrium to the barium is equivalent to 0.0007 to 0.03 of the molar ratio of $Y_2O_3$ to barium. Mass of the tantalum in the dielectric ceramic is equal to that of 10.4 to 26.1 parts by mass of $Ta_2O_5$ with respect to 100 parts by mass of the barium titanate.

The dielectric ceramic comprises crystal grains that contain the barium titanate as a main component and a grain boundary phase which is located between the crystal grains or among the crystal grains. The grain boundary phase refers, without limitation, to amorphous phases or crystal phases, derived from accessory components such as magnesium, yttrium, manganese and tantalum. The grain boundary of each of the crystal grains can be formed by a liquid-phase sintering with barium titanate and the accessory components (i.e., magnesium, yttrium, manganese and tantalum). In addition, an average grain size of the crystal grains is 0.05 to 0.2 µm.

According to the present embodiment, in the dielectric ceramic, a crystal of the barium titanate comprises a solid solution of magnesium, yttrium, manganese and tantalum. The solid solution turns a crystal structure of the barium titanate into a cubic system structure comprising tetragonal crystals having a high ferroelectric property and an average grain size of the crystal in a range of 0.05 to 0.2 µm. With the cubic system structure, the ferroelectric property due to the crystal structure of the tetragonal crystals is lowered, and the paraelectric property is consequently enhanced, thereby making it possible to reduce spontaneous polarization because of the enhanced paraelectric property.

The dielectric ceramic having the above-mentioned compositions and grain sizes can achieve a relative dielectric constant at room temperature (25° C.) of 200 or more, a relative dielectric constant at 125° C. of 180 or more, and a temperature coefficient (($\in$125−$\in$25)/$\in$25(125−25)) of relative dielectric constant in a temperature range of 25° C. to 125° C. of 1000×10$^{-6}$/° C. or less in its absolute value. Such a dielectric ceramic can also have a small hysteresis in electric-field versus dielectric polarization characteristic.

Turning the crystals into the cubic system can realize a constant rate of change in relative dielectric constant in a temperature range of −55° C. to 125° C. Consequently, the hysteresis in the electric field versus dielectric polarization characteristic becomes small. For this reason, even if the relative dielectric constant can be 200 or more, a temperature coefficient of relative dielectric constant of a dielectric ceramic can be small.

In other words, when the magnesium, the yttrium and the manganese are contained in the barium titanate in the above-mentioned range, the dielectric ceramic can have a Curie temperature of 25° C. or more and have a positive value in its temperature coefficient in the relative dielectric constant. In addition, when the tantalum is further added the dielectric ceramic having such a dielectric property, the temperature coefficient of the relative dielectric constant can be smaller and the temperature characteristic can be further flattened. In this case, a curve of the rate of change in the relative dielectric constant may have two peaks, centered at 25° C. in the temperature range from −55° C. to 125° C. In other words, one peak may appear between −55° C. and 25° C. and the other peak may appear between 25° C. and 125° C.

The tantalum may prevent the crystals of the dielectric ceramic from having significant grain growth. The mass ratio of the tantalum to the barium titanate may be equivalent to 10.4 to 26.1 parts by mass of $Ta_2O_5$ with respect to 100 parts by mass of barium titanate.

When the mass ratio of the tantalum to the barium titanate is equivalent to less than 10.4 parts by mass of $Ta_2O_5$ with respect to 100 parts by mass of the barium titanate, the resultant dielectric ceramic has a high temperature coefficient in the relative dielectric constant, but a relatively large hysteresis of dielectric hysteresis in the electric field versus dielectric polarization characteristic. In contrast, when the mass ratio of the tantalum to the barium titanate is equivalent to more than 26.1 parts by mass of $Ta_2O_5$ with respect to 100 parts by mass of the barium titanate, the relative dielectric constant at 25° C. may be lower than 200, the relative dielectric constant at 125° C. may be less than 180 and a temperature coefficient of the relative dielectric constant in a temperature range of 25° C. to 125° C. (($\in$125−$\in$25)/$\in$25(125−25)) is larger than 1000× 10$^6$/° C. in its absolute value.

In one embodiment, the molar ratio of the magnesium may be 0.01 to 0.06 with respect to the barium included in the dielectric ceramic, the molar ratio of yttrium may be 0.0014 to 0.06 with respect to the barium included in the dielectric ceramic, and the molar ratio of the manganese may be 0.0002 to 0.03 with respect to the barium included in the dielectric ceramic. If the molar ratio of the magnesium is less than 0.01 with respect to the barium included in the dielectric ceramic, or if the molar ratio of the magnesium is more than 0.06 with respect to the barium included in the dielectric ceramic, the resultant dielectric ceramic may have a low relative dielectric constant or have a high temperature coefficient in the relative dielectric constant. If the molar ratio of the yttrium is less than 0.0014 with respect to the barium included in the dielectric ceramic, or if the molar ratio of the yttrium is more than 0.06 with respect to the barium included in the dielectric ceramic, the resultant dielectric ceramic has a low relative dielectric constant. Furthermore, if the molar ratio of manganese per 1 mole of barium included in the dielectric ceramic is less than 0.0002, the resultant dielectric ceramic may have a high temperature coefficient in the relative dielectric constant. If the molar ratio of manganese per 1 mole of barium included in the dielectric ceramic is more than 0.03, the resultant dielectric ceramic may have a low relative dielectric constant.

The average grain size of the crystal grains in the dielectric ceramic is 0.05 to 0.2 µm, according to the present embodiment. By setting the average grain size of the crystal grains in dielectric ceramic in a range of 0.05 to 0.2 µm, the crystal grains of the dielectric ceramic including the barium titanate as a main component are allowed to have a crystal structure mainly comprising the cubic system, and the hysteresis in electric-field versus dielectric polarization characteristic may be small so as to exhibit substantially a paraelectric property. In contrast, when the average grain size of the crystal grains in dielectric ceramic is smaller than 0.05 µm, since no effect of oriented polarization is exerted, the relative dielectric constant of the dielectric ceramic may be low. In addition, if the average grain size of the crystal grains in dielectric ceramic is greater than 0.2 µm, a crystal phase of a tetragonal system may be observed by X-ray diffraction, and the dielectric ceramic may have a high temperature coefficient in relative dielectric constant.

The crystal structure mainly comprising the cubic system refers to a structure in which the intensity of an X-ray diffraction peak on the (110) plane that is the strongest peak in barium titanate of the cubic system is greater than the intensity of an X-ray diffraction peak of the different phase.

The average grain size of the crystal grains of the dielectric ceramic may be between 0.14 and 0.18 µm. In this size range, a polarization charge of the dielectric ceramic at 0V can be 20 nC/cm$^2$ or less in the electric-field versus dielectric polarization characteristic.

In one embodiment, the mass ratio of the tantalum to the barium titanate may be equivalent to 15.6 to 20.8 parts by mass of the $Ta_2O_5$ with respect to 100 parts by mass of the barium titanate, and the molar ratio of titanium with respect to barium may be 0.97 to 0.98. The molar ratios of the magnesium, the yttrium and the manganese to the barium may be 0.017 to 0.06, 0.01 to 0.02, and 0.01 to 0.03, respectively. The relative dielectric constant of the dielectric ceramic with the above composition can be 250 or more at 25° C., or 240 or more at 125° C., and the temperature coefficient in the relative dielectric constant can be 500×10$^{-6}$/° C. or less in the absolute value.

The average grain size of crystal grains of the dielectric ceramic can be measured, without limitation, by using a scanning electron microscope as described later.

The relative dielectric constants at 25° C. and 125° C. may be calculated, without limitation, from measured values by using an LCR meter as described below.

The dielectric ceramic may further contain silicon and boron. The mass of silicon thereof is set to 0.73 to 6.3 parts by mass of $SiO_2$ with respect to 100 parts by mass of the barium titanate, and the mass of boron thereof is set equal to 0.31 to 2.1 parts by mass of $B_2O_3$ with respect to 100 parts by mass of barium titanate.

Alternatively, the dielectric ceramic may contain silicon and lithium. Lithium may substitute a part of or all of boron in the dielectric ceramic. The mass of silicon is set to 0.73 to 6.3 parts by mass of $SiO_2$ with respect to 100 parts by mass of the barium titanate, and the mass of the lithium is set equal to 0.31 to 2.1 parts by mass of $Li_2O$ with respect to 100 parts by mass of barium titanate.

Silicon and boron or silicon and lithium contained therein may enhance the liquid-phase sintering. In other words, the combination of these elements may lower the sintering temperature of the dielectric ceramic to the temperature range from 1100 to 1250° C.

If silicon/boron or silicon/lithium are contained therein, the average grain size of the crystal grains may be set in a range from 0.1 to 0.18 µm in order to achieve the polarization charge of 20 nC/cm$^2$ or less at 0V in the electric-field versus dielectric polarization characteristic.

A method for producing a dielectric ceramic is discussed below.

$BaCO_3$ powder, $TiO_2$ powder, MgO powder, $Y_2O_3$ powder and manganese carbonate ($MnCO_3$) powder, each having a purity of 99% or more, are used as a raw materials. These powders are respectively blended so as to contain ratios of 0.01 to 0.06 mole of MgO per 1 mole of barium included in the dielectric ceramic, 0.0007 to 0.03 mole of $Y_2O_3$ per 1 mole of barium included in the dielectric ceramic and 0.0002 to 0.03 mole of $MnCO_3$ per 1 mole of barium included in the dielectric ceramic.

The mixture of the powders are wet-mixtured, and after having been dried, it is calcined at a temperature in a range of 900 to 1100° C. to produce calcined powder, and then the calcined powder is pulverized. The crystal structure of the calcined powder may then become mainly a cubic system. The resultant calcined powder may have an average diameter of 0.04 to 0.1 µm. The sintered product can comprise crystal grains including a cubic structure by using the resultant calcined powders and allowing grain growth of the crystal grains to an appropriate grain size (i.e., 0.05 to 0.2 µm of average grain size). In this manner, a dielectric ceramic with a high dielectric constant which a temperature characteristic in the relative dielectric constant close to the paraelectric property is obtained.

Then, the $Ta_2O_5$ powder is added to and mixed with the calcined powder. The mass of $Ta_2O_5$ powder is 10 to 25 parts by mass with respect to 100 parts by mass of the calcined powder. In addition, $SiO_2/B_2O_3$, $SiO_2/Li_2O$ or the combination thereof can be added to the calcined powder together with $Y_2O_3$. In one embodiment, 0.7 to 6.0 parts by mass of $SiO_2$ with respect to 100 parts by mass of the barium titanate, and 0.3 to 2.0 parts by mass of $B_2O_3$ and/or $Li_2O$ with respect to 100 parts by mass of barium titanate are added. Addition of $SiO_2/B_2O_3$, $SiO_2/Li_2O$ or the combination thereof into the calcined powder can lower the sintering temperature. The addition can also suppress excessive grain growth even in the liquid-phase sintering process, although it is generally supposed that the ceramic grains easily grow in a liquid-phase sintering process.

Then, the mixed powder is molded into pellets. If the molded pellets of the mixed powder contain $SiO_2/B_2O_3$ or $SiO_2/Li_2O$, the pellets can be sintered at a temperature in a range of 1100° C. to 1250° C. in the atmosphere to obtain a dielectric ceramic. If the sintering temperature is lower than 1100° C., the density of the dielectric ceramic may be low due to a lack of grain growth and densification of the crystal grains. In contrast, if the sintering temperature is higher than 1250° C., the crystal grains of the dielectric ceramic may have excessive unnecessary grain growth.

If the molded pellets do not contain $SiO_2/B_2O_3$ or $SiO_2/Li_2O$ the pellets are sintered at a temperature in a range of 1200° C. to 1300° C. in the atmosphere to obtain the dielectric ceramics. The sintering may be carried out in the atmosphere or in a reducing atmosphere. If the sintering temperature is lower than 1200° C., the density of the dielectric ceramic may be low due to a lack of grain growth and densification of the crystal grains. In contrast, if the sintering temperature is higher than 1300° C., the crystal grains of the dielectric ceramic may have excessive unnecessary grain growth.

A capacitor can be manufactured, using the above-mentioned dielectric ceramic as described below.

Figure 1:
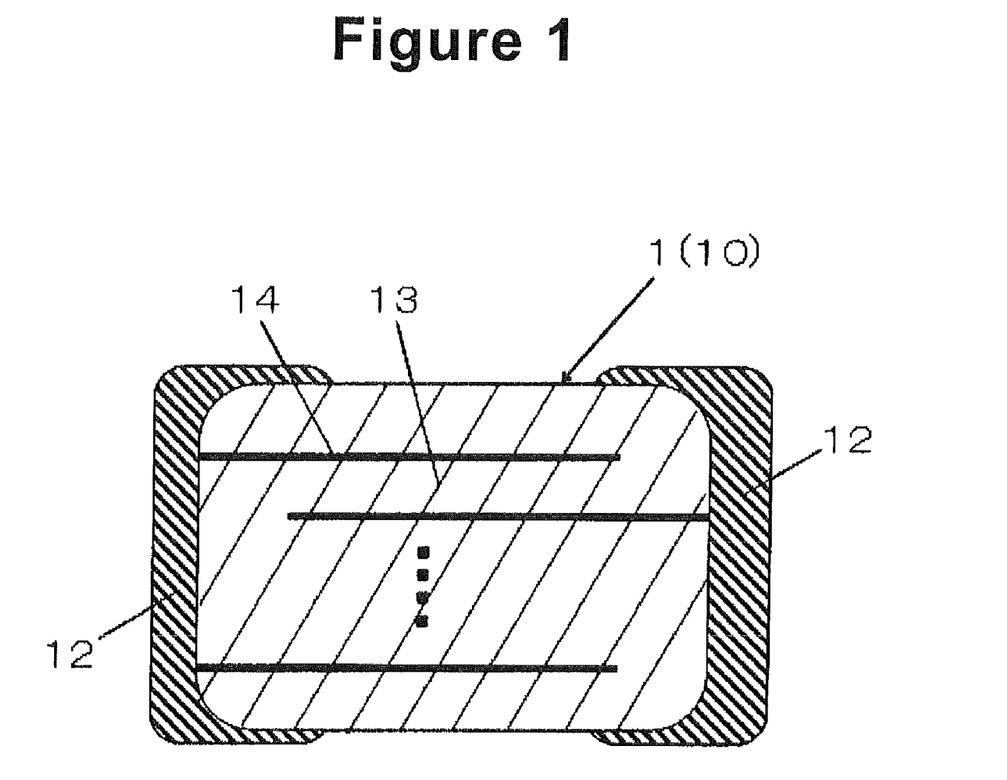
FIG. 1 is a schematic cross-sectional view illustrating an exemplary multilayer ceramic capacitor according to an embodiment of the invention.

FIG. 1 is a schematic cross-sectional view illustrating a multilayer ceramic capacitor according to an embodiment of the present invention. As shown FIG. 1, the capacitor comprises a laminated body 1 which comprises external electrodes 12 on the two ends of the capacitor main body 10. The capacitor main body 10 comprises a laminated body 1 in which a plurality of dielectric layers 13 and a plurality of conductor layers 14 serving as inner electrode layers are alternately laminated. The dielectric layers 13 are made of the dielectric ceramic according to an embodiment of the present discourse. In other words, the capacitor can have a higher capacity and more stable capacity temperature characteristic than an existing capacitor by using the dielectric ceramic as the dielectric layers 13. This is because the dielectric ceramic according to an embodiment of the invention has a high dielectric constant, a stable temperature characteristic in the relative dielectric constant, and a small spontaneous polarization. Therefore, the capacitor can reduce a noise sound caused by an electrically induced strain in a power supply circuit.

Each of the dielectric layers 13 may have the thickness of 1 to 5 μm. In addition, the thinning of the dielectric layers 13 such as the thickness of each of the dielectric layers 13 maybe 5 μm or less which may increase the electrostatic capacity of the capacitor.

The conductor layer 14 is, without limitation, made of base metals, such as Ni and Cu in order to reduce the manufacturing cost. In particular, the conductor layer 14 may be made from Ni to easily carry out a simultaneous sintering with the dielectric layer 13. An average thickness of the conductor layer 14 may be, without limitation, 1 μm or less.

The aforementioned mixed powder is molded onto a green sheet to manufacture such a capacitor. A conductive paste for forming the conductor layer 14 is prepared and then applied on the surface of the green sheet. The resultant sheets are laminated, and then sintered to form the laminated green body. Thereafter, the conductor paste is further applied to the two end faces of the laminated green body for forming external electrodes 12, and the resultant laminated body is sintered to obtain a capacitor of the present embodiment.

Embodiments of the invention are further explained in detail in context of the following examples below.

Example

First, $BaCO_3$ powder, $TiO_2$ powder, MgO powder, $Y_2O_3$ powder and $MnCO_3$ powder, each having a purity of 99.9%, were provided, and these were blended at compounding ratios shown in Tables 1 to 3 so that mixed powder was prepared. The amounts of the magnesium (Mg), the yttrium (Y) and the manganese (Mn) are shown in Table 1 as a molar ratio of MgO, $Y_2O_3$ and MnO with respect to 1 mole of Ba respectively. The yttrium content was indicated by the molar ratio of the $Y_2O_3$ to the barium. Notably, the molar ratio of the yttrium to the barium is twice of the molar ratio of the $Y_2O_3$ to the barium. The amount of the titanium (Ti) is indicated by a molar ratio to 1 mole of the barium (Ba).

The mixed powder prepared as described above was calcined at 1000° C., and the resultant calcined powder was pulverized.

Thereafter, the $Ta_2O_5$ powder having a purity of 99.9% was mixed with 100 parts by weight of the pulverized powder at a ratio shown in FIG. 11. In addition, the $Ta_2O_5$ powder, the $SiO_2$ powder and the $B_2O_3$ powder, each having a purity of 99.9%, were mixed with 100 parts by weight of the pulverized powder at ratios shown in Table 2. Furthermore, the $Ta_2O_5$ powder, the $SiO_2$ powder and the $Li_2O$ powder, each having a purity of 99.9%, were mixed with 100 parts by weight of the temporarily sintered powder at ratios shown in Table 3. These mixed powders were respectively granulated, and molded into pellets having a diameter of 16.5 mm and a thickness of 1 mm.

TABLE 1

| Sample No. | Composition | | | | | $Ta_2O_5$ | Avarage Particle Size of Calsinated Powder | Sintering Temperature |
|---|---|---|---|---|---|---|---|---|
| | Molar ratios with respect to Ba | | | | | | | |
| | Ba | Mg | Y | Mn | Ti | parts by mass | μm | ° C. |
| 1 | 1 | 0.020 | 0.01 | 0.01 | 0.98 | 75 | 0.1 | 1250 |
| 2 | 1 | 0.020 | 0.01 | 0.01 | 0.98 | 10.0 | 0.1 | 1250 |
| 3 | 1 | 0.020 | 0.01 | 0.01 | 0.98 | 15.0 | 0.1 | 1250 |
| 4 | 1 | 0.020 | 0.01 | 0.01 | 0.98 | 20.0 | 0.1 | 1250 |
| 5 | 1 | 0.020 | 0.01 | 0.01 | 0.98 | 25.0 | 0.1 | 1250 |
| 6 | 1 | 0.020 | 0.01 | 0.01 | 0.98 | 35.0 | 0.1 | 1250 |
| 7 | 1 | 0.020 | 0.0002 | 0.01 | 0.98 | 15.0 | 0.1 | 1250 |
| 8 | 1 | 0.020 | 0.0015 | 0.01 | 0.98 | 15.0 | 0.1 | 1250 |
| 9 | 1 | 0.020 | 0.005 | 0.01 | 0.98 | 15.0 | 0.1 | 1250 |
| 10 | 1 | 0.020 | 0.03 | 0.01 | 0.98 | 15.0 | 0.1 | 1250 |
| 11 | 1 | 0.020 | 0.04 | 0.01 | 0.98 | 15.0 | 0.1 | 1250 |
| 12 | 1 | 0.005 | 0.010 | 0.01 | 0.98 | 15.0 | 0.1 | 1250 |
| 13 | 1 | 0.010 | 0.01 | 0.01 | 0.98 | 15.0 | 0.1 | 1250 |
| 14 | 1 | 0.017 | 0.01 | 0.01 | 0.98 | 15.0 | 0.1 | 1250 |
| 15 | 1 | 0.023 | 0.01 | 0.01 | 0.98 | 15.0 | 0.1 | 1250 |
| 16 | 1 | 0.060 | 0.01 | 0.01 | 0.98 | 15.0 | 0.1 | 1250 |

TABLE 1-continued

| | Composition | | | | | Avarage Particle Size of Calsinated | Sintering |
|---|---|---|---|---|---|---|---|
| Sample | Molar ratios with respect to Ba | | | | Ta$_2$O$_5$ | Powder | Temperature |
| No. | Ba | Mg | Y | Mn | Ti | parts by mass | μm | ° C. |

| Sample No. | Ba | Mg | Y | Mn | Ti | Ta$_2$O$_5$ parts by mass | Powder μm | Temperature ° C. |
|---|---|---|---|---|---|---|---|---|
| 17 | 1 | 0.070 | 0.01 | 0.01 | 0.98 | 15.0 | 0.1 | 1250 |
| 18 | 1 | 0.020 | 0.01 | 0.0002 | 0.98 | 15.0 | 0.1 | 1250 |
| 19 | 1 | 0.020 | 0.01 | 0.005 | 0.98 | 15.0 | 0.1 | 1250 |
| 20 | 1 | 0.020 | 0.01 | 0.008 | 0.98 | 15.0 | 0.1 | 1250 |
| 21 | 1 | 0.020 | 0.01 | 0.015 | 0.98 | 15.0 | 0.1 | 1250 |
| 22 | 1 | 0.020 | 0.01 | 0.03 | 0.98 | 15.0 | 0.1 | 1250 |
| 23 | 1 | 0.020 | 0.01 | 0.04 | 0.98 | 15.0 | 0.1 | 1250 |
| 24 | 1 | 0.020 | 0.01 | 0.01 | 0.98 | 15.0 | 0.1 | 1250 |
| 25 | 1 | 0.020 | 0.01 | 0.01 | 0.98 | 15.0 | 0.1 | 1250 |
| 26 | 1 | 0.020 | 0.01 | 0 | 0.98 | 15.0 | 0.1 | 1250 |
| 27 | 1 | 0.020 | 0.03 | 0.01 | 0.98 | 15.0 | 0.04 | 1250 |
| 28 | 1 | 0.020 | 0.03 | 0.01 | 0.98 | 15.0 | 0.04 | 1150 |
| 29 | 1 | 0.020 | 0.01 | 0.01 | 0.98 | 10.0 | 0.1 | 1330 |
| 30 | 1 | 0.020 | 0.01 | 0.01 | 0.98 | 15.0 | 0.1 | 1200 |
| 31 | 1 | 0.020 | 0.01 | 0.01 | 0.98 | 15.0 | 0.1 | 1300 |
| 32 | 1 | 0.020 | 0.0007 | 0.01 | 0.98 | 15.0 | 0.1 | 1250 |

TABLE 2

| | Composition | | | | | | | | | |
|---|---|---|---|---|---|---|---|---|---|---|
| | | | | | | Ratios with respect to 100 parts by mass of Barium Titanate | | | Avarage Particle Size of | |
| Sample | Molar ratios with respect to Ba | | | | | Ta$_2$O$_5$ parts by mass | SiO$_2$ parts by mass | B$_2$O$_3$ parts by mass | Calsinated Powder | Sintering Temperature |
| No. | Ba | Mg | Y | Mn | Ti | mass | mass | mass | μm | ° C. |
| 33 | 1 | 0.020 | 0.010 | 0.010 | 0.980 | 7.5 | 1.5 | 0.5 | 0.1 | 1200 |
| 34 | 1 | 0.020 | 0.010 | 0.010 | 0.980 | 10.0 | 1.5 | 0.5 | 0.1 | 1200 |
| 35 | 1 | 0.020 | 0.010 | 0.010 | 0.980 | 11.6 | 1.5 | 0.5 | 0.1 | 1200 |
| 36 | 1 | 0.020 | 0.010 | 0.010 | 0.980 | 13.5 | 1.5 | 0.5 | 0.1 | 1200 |
| 37 | 1 | 0.020 | 0.010 | 0.010 | 0.980 | 15.0 | 1.5 | 0.5 | 0.1 | 1200 |
| 38 | 1 | 0.020 | 0.010 | 0.010 | 0.980 | 18.4 | 1.5 | 0.5 | 0.1 | 1200 |
| 39 | 1 | 0.020 | 0.010 | 0.010 | 0.980 | 22.6 | 1.5 | 0.5 | 0.1 | 1200 |
| 40 | 1 | 0.020 | 0.010 | 0.010 | 0.980 | 25.0 | 1.5 | 0.5 | 0.1 | 1200 |
| 41 | 1 | 0.020 | 0.010 | 0.010 | 0.980 | 35.0 | 1.5 | 0.5 | 0.1 | 1200 |
| 42 | 1 | 0.020 | 0.0002 | 0.010 | 0.980 | 15.0 | 1.5 | 0.5 | 0.1 | 1200 |
| 43 | 1 | 0.020 | 0.0007 | 0.010 | 0.980 | 15.0 | 1.5 | 0.5 | 0.1 | 1200 |
| 44 | 1 | 0.020 | 0.0015 | 0.010 | 0.980 | 15.0 | 1.5 | 0.5 | 0.1 | 1200 |
| 45 | 1 | 0.020 | 0.005 | 0.010 | 0.980 | 15.0 | 1.5 | 0.5 | 0.1 | 1200 |
| 46 | 1 | 0.020 | 0.007 | 0.010 | 0.980 | 15.0 | 1.5 | 0.5 | 0.1 | 1200 |
| 47 | 1 | 0.020 | 0.030 | 0.010 | 0.980 | 15.0 | 1.5 | 0.5 | 0.1 | 1200 |
| 48 | 1 | 0.020 | 0.040 | 0.010 | 0.980 | 15.0 | 1.5 | 0.5 | 0.1 | 1200 |
| 49 | 1 | 0.005 | 0.010 | 0.010 | 0.980 | 15.0 | 1.5 | 0.5 | 0.1 | 1200 |
| 50 | 1 | 0.010 | 0.010 | 0.010 | 0.980 | 15.0 | 1.5 | 0.5 | 0.1 | 1200 |
| 51 | 1 | 0.017 | 0.010 | 0.010 | 0.980 | 15.0 | 1.5 | 0.5 | 0.1 | 1200 |
| 52 | 1 | 0.023 | 0.010 | 0.010 | 0.980 | 15.0 | 1.5 | 0.5 | 0.1 | 1200 |
| 53 | 1 | 0.040 | 0.010 | 0.010 | 0.980 | 15.0 | 1.5 | 0.5 | 0.1 | 1200 |
| 54 | 1 | 0.060 | 0.010 | 0.010 | 0.980 | 15.0 | 1.5 | 0.5 | 0.1 | 1150 |
| 55 | 1 | 0.070 | 0.010 | 0.010 | 0.980 | 15.0 | 1.5 | 0.5 | 0.1 | 1200 |
| 56 | 1 | 0.020 | 0.010 | 0.005 | 0.980 | 15.0 | 1.5 | 0.5 | 0.1 | 1200 |
| 57 | 1 | 0.020 | 0.010 | 0.008 | 0.980 | 15.0 | 1.5 | 0.5 | 0.1 | 1200 |
| 58 | 1 | 0.020 | 0.010 | 0.013 | 0.980 | 15.0 | 1.5 | 0.5 | 0.1 | 1200 |
| 59 | 1 | 0.020 | 0.010 | 0.015 | 0.980 | 15.0 | 1.5 | 0.5 | 0.1 | 1200 |
| 60 | 1 | 0.020 | 0.010 | 0.030 | 0.980 | 15.0 | 1.5 | 0.5 | 0.1 | 1200 |
| 61 | 1 | 0.020 | 0.010 | 0.040 | 0.980 | 15.0 | 1.5 | 0.5 | 0.1 | 1200 |
| 62 | 1 | 0.020 | 0.010 | 0.010 | 0.970 | 15.0 | 1.5 | 0.5 | 0.1 | 1200 |
| 63 | 1 | 0.020 | 0.010 | 0.010 | 0.990 | 15.0 | 1.5 | 0.5 | 0.1 | 1200 |
| 64 | 1 | 0.020 | 0.010 | 0 | 0.980 | 15.0 | 1.5 | 0.5 | 0.1 | 1200 |
| 65 | 1 | 0.020 | 0.010 | 0.010 | 0.980 | 15.0 | 0.7 | 0.3 | 0.1 | 1250 |
| 66 | 1 | 0.020 | 0.010 | 0.010 | 0.980 | 15.0 | 2.5 | 0.5 | 0.1 | 1150 |
| 67 | 1 | 0.020 | 0.010 | 0.010 | 0.980 | 15.0 | 3 | 1 | 0.1 | 1150 |
| 68 | 1 | 0.020 | 0.010 | 0.010 | 0.980 | 15.0 | 4.5 | 1.5 | 0.1 | 1150 |
| 69 | 1 | 0.020 | 0.010 | 0.010 | 0.980 | 15.0 | 6 | 2 | 0.1 | 1100 |
| 70 | 1 | 0.020 | 0.030 | 0.010 | 0.980 | 15.0 | 1.5 | 0.5 | 0.04 | 1200 |
| 71 | 1 | 0.020 | 0.030 | 0.010 | 0.980 | 15.0 | 1.5 | 0.5 | 0.04 | 1160 |

TABLE 2-continued

| | Composition | | | | | | | | |
|---|---|---|---|---|---|---|---|---|---|
| | | | | | | Ratios with respect to 100 parts by mass of Barium Titanate | | Avarage Particle Size of | |
| Sample No. | Molar ratios with respect to Ba | | | | | $Ta_2O_5$ parts by mass | $SiO_2$ parts by mass | $B_2O_3$ parts by mass | Calsinated Powder μm | Sintering Temperature ° C. |
| | Ba | Mg | Y | Mn | Ti | | | | | |
| 72 | 1 | 0.020 | 0.010 | 0.010 | 0.980 | 15.0 | 1.5 | 0.5 | 0.1 | 1230 |

TABLE 3

| | Composition | | | | | | | | | |
|---|---|---|---|---|---|---|---|---|---|---|
| | | | | | | Ratios with respect to 100 parts by mass of Barium Titanate | | | Avarage Particle Size of | |
| Sample No. | Molar ratios with respect to Ba | | | | | $Ta_2O_5$ parts by mass | $SiO_2$ parts by mass | $Li_2O$ parts by mass | Calsined Powder μm | Sintering Temperature ° C. |
| | Ba | Mg | Y | Mn | Ti | | | | | |
| 73 | 1 | 0.020 | 0.010 | 0.010 | 0.980 | 7.5 | 1.5 | 0.5 | 0.1 | 1200 |
| 74 | 1 | 0.020 | 0.010 | 0.010 | 0.980 | 10.0 | 1.5 | 0.5 | 0.1 | 1200 |
| 75 | 1 | 0.020 | 0.010 | 0.010 | 0.980 | 11.6 | 1.5 | 0.5 | 0.1 | 1200 |
| 76 | 1 | 0.020 | 0.010 | 0.010 | 0.980 | 13.5 | 1.5 | 0.5 | 0.1 | 1200 |
| 77 | 1 | 0.020 | 0.010 | 0.010 | 0.980 | 15.0 | 1.5 | 0.5 | 0.1 | 1200 |
| 78 | 1 | 0.020 | 0.010 | 0.010 | 0.980 | 18.4 | 1.5 | 0.5 | 0.1 | 1200 |
| 79 | 1 | 0.020 | 0.010 | 0.010 | 0.980 | 22.6 | 1.5 | 0.5 | 0.1 | 1200 |
| 80 | 1 | 0.020 | 0.010 | 0.010 | 0.980 | 25.0 | 1.5 | 0.5 | 0.1 | 1200 |
| 81 | 1 | 0.020 | 0.010 | 0.010 | 0.980 | 35.0 | 1.5 | 0.5 | 0.1 | 1200 |
| 82 | 1 | 0.020 | 0.0002 | 0.010 | 0.980 | 15.0 | 1.5 | 0.5 | 0.1 | 1200 |
| 83 | 1 | 0.020 | 0.0007 | 0.010 | 0.980 | 15.0 | 1.5 | 0.5 | 0.1 | 1200 |
| 84 | 1 | 0.020 | 0.0015 | 0.010 | 0.980 | 15.0 | 1.5 | 0.5 | 0.1 | 1200 |
| 85 | 1 | 0.020 | 0.005 | 0.010 | 0.980 | 15.0 | 1.5 | 0.5 | 0.1 | 1200 |
| 86 | 1 | 0.020 | 0.007 | 0.010 | 0.980 | 15.0 | 1.5 | 0.5 | 0.1 | 1200 |
| 87 | 1 | 0.020 | 0.030 | 0.010 | 0.980 | 15.0 | 1.5 | 0.5 | 0.1 | 1200 |
| 88 | 1 | 0.020 | 0.040 | 0.010 | 0.980 | 15.0 | 1.5 | 0.5 | 0.1 | 1200 |
| 89 | 1 | 0.005 | 0.010 | 0.010 | 0.980 | 15.0 | 1.5 | 0.5 | 0.1 | 1200 |
| 90 | 1 | 0.010 | 0.010 | 0.010 | 0.980 | 15.0 | 1.5 | 0.5 | 0.1 | 1200 |
| 91 | 1 | 0.017 | 0.010 | 0.010 | 0.980 | 15.0 | 1.5 | 0.5 | 0.1 | 1200 |
| 92 | 1 | 0.023 | 0.010 | 0.010 | 0.980 | 15.0 | 1.5 | 0.5 | 0.1 | 1200 |
| 93 | 1 | 0.040 | 0.010 | 0.010 | 0.980 | 15.0 | 1.5 | 0.5 | 0.1 | 1200 |
| 94 | 1 | 0.060 | 0.010 | 0.010 | 0.980 | 15.0 | 1.5 | 0.5 | 0.1 | 1150 |
| 95 | 1 | 0.070 | 0.010 | 0.010 | 0.980 | 15.0 | 1.5 | 0.5 | 0.1 | 1200 |
| 96 | 1 | 0.020 | 0.010 | 0.005 | 0.980 | 15.0 | 1.5 | 0.5 | 0.1 | 1200 |
| 97 | 1 | 0.020 | 0.010 | 0.008 | 0.980 | 15.0 | 1.5 | 0.5 | 0.1 | 1200 |
| 98 | 1 | 0.020 | 0.010 | 0.013 | 0.980 | 15.0 | 1.5 | 0.5 | 0.1 | 1200 |
| 99 | 1 | 0.020 | 0.010 | 0.015 | 0.980 | 15.0 | 1.5 | 0.5 | 0.1 | 1200 |
| 100 | 1 | 0.020 | 0.010 | 0.030 | 0.980 | 15.0 | 1.5 | 0.5 | 0.1 | 1200 |
| 101 | 1 | 0.020 | 0.010 | 0.040 | 0.980 | 15.0 | 1.5 | 0.5 | 0.1 | 1200 |
| 102 | 1 | 0.020 | 0.010 | 0.010 | 0.970 | 15.0 | 1.5 | 0.5 | 0.1 | 1200 |
| 103 | 1 | 0.020 | 0.010 | 0.010 | 0.990 | 15.0 | 1.5 | 0.5 | 0.1 | 1200 |
| 104 | 1 | 0.020 | 0.010 | 0 | 0.980 | 15.0 | 1.5 | 0.5 | 0.1 | 1200 |
| 105 | 1 | 0.020 | 0.010 | 0.010 | 0.980 | 15.0 | 0.7 | 0.3 | 0.1 | 1250 |
| 106 | 1 | 0.020 | 0.010 | 0.010 | 0.980 | 15.0 | 2.5 | 0.5 | 0.1 | 1170 |
| 107 | 1 | 0.020 | 0.010 | 0.010 | 0.980 | 15.0 | 3 | 1 | 0.1 | 1150 |
| 108 | 1 | 0.020 | 0.010 | 0.010 | 0.980 | 15.0 | 4.5 | 1.5 | 0.1 | 1150 |
| 109 | 1 | 0.020 | 0.010 | 0.010 | 0.980 | 15.0 | 6 | 2 | 0.1 | 1100 |
| 110 | 1 | 0.020 | 0.030 | 0.010 | 0.980 | 15.0 | 1.5 | 0.5 | 0.04 | 1200 |
| 111 | 1 | 0.020 | 0.030 | 0.010 | 0.980 | 15.0 | 1.5 | 0.5 | 0.04 | 1160 |
| 112 | 1 | 0.020 | 0.010 | 0.010 | 0.980 | 15.0 | 1.5 | 0.5 | 0.1 | 1230 |

The average particle size of the pulverized powder was measured by the following processes: the particles of the pulverized powder was scattered on the sample stage of a scanning electron microscope, photograph of the particles were taken, profiles of the particles on the photograph were image-processed, the diameter of each particle was measured and the average value thereof was calculated with an assumption that each particle is round with the same area. The magnification of the photograph was set to 30,000 times, and the number of particles observed was set to three for each of the specimens to calculate the average value.

Next, ten pieces of pellets for each composition were sintered in the atmosphere at a temperature shown in Tables 1 to 3. The average grain size of crystal grains of the dielectric ceramic including the barium titanate as a main component was measured in the following processes. First, the fractured surface of a sintered sample was roughly polished with a polishing paper of #1200, and was then subjected to a polishing process by using a diamond paste having a grain size of 3 µm applied on a hard buff, and this was further subjected to a finish polishing process by using a soft buff with alumina abrasive grains applied thereon and having a grain size of 0.3 µm.

Next, the resultant fractured surface of the sintered pellets was etched by an acidic aqueous solution (hydrochloric acid-hydrogen fluoride), and the inner microstructure thereof was then photographed with a scanning electron microscope. Then, profiles of the crystal grains of the dielectric ceramic appearing on the photograph were image-processed, and the diameter of each particle was measured and the average value thereof was calculated with an assumption that each particle had approximately a same area. The magnification of the photograph was set to 30,000 times, and the number of grains observed in an area of size of 10 cm×15 cm of the photograph was set to three for each of the samples, and then the average value thereof was calculated.

Next, an indium-gallium conductor paste was applied, to form a conductive layer, on the upper and lower surface of the sintered pellet. The samples were used for evaluation. Tables 4 to 6 show the results.

The relative dielectric constant can be measured, without limitation, in the following processes. The electrostatic capacity of each of samples of dielectric ceramics thus produced was measured by using an inductance, capacitance, and resistance (LCR) meter under conditions of a frequency of 1.0 kHz and an input signal level of 1.0V at temperatures of 25° C. and 125° C. Then, the relative dielectric constants at 25° C. and 125° C. were calculated based upon the diameter and thickness of the sample and the area of the conductor layer formed on the surface of the dielectric ceramic.

Moreover, the temperature coefficient of the relative dielectric constant was calculated by substituting each of the relative dielectric constants at 25° C. and 125° C. for the following expression:

$$TC = (\epsilon_{125} - \epsilon_{25}) / \{\epsilon_{25} * (125 - 25)\}$$

where $\epsilon_{25}$ and $\epsilon_{125}$ are relative dielectric constants at 25° C. and 125° C., respectively. These measurements were carried out by setting the number of samples to 10 and calculating the average value thereof.

Then, electrically induced strain was measured by a dielectric polarization (polarization charge) measurement for the resultant samples. In this case, the measurement was made based upon the quantity of charge (residual polarization) at 0V when the voltage is changed within a range of ±1250V. Also, crystals of the dielectric ceramic are identified by X-ray diffraction (20 to 600 of 2θ with Cu—Kα)

The compositions of the obtained dielectric ceramics were determined by using Inductively Coupled Plasma (ICP) emission spectroscopy and atomic absorption spectroscopy. Specifically, a mixture of each resultant dielectric ceramic, boric acid and sodium carbonate was melted and dissolved in hydrochloric acid, and the resultant solution was qualitatively analyzed by atomic absorption spectroscopy for elements contained in the dielectric ceramic. Then, the identified elements were quantified by ICP emission spectroscopy with standard samples obtained by diluting standard solutions of the elements. The oxygen content was measured with the assumption that the elements had valences shown in the periodic table of elements.

The compositions of powder mixture are shown in the Tables 1 to 3. The average particle sizes of the calcined powders and the sintering temperatures for the calcined powders are also shown in Tables 1 to 3. The average grain diameters and of the characteristics (relative dielectric constant, the absolute value of temperature coefficient of relative dielectric constant, temperature change curve in relative dielectric constant and polarized charge) are shown in Tables 4 to 6.

The amounts of the $Ta_2O_5$ additive in the Tables 1-3 corresponds to a mass ratio with respect to 100 parts by mass of calcined powder while the mass ratio of the $Ta_2O_5$ in Tables 4 to 6 correspond to a mass ratio relative to 100 parts by mass of barium titanate in the dielectric ceramic (sample). Amounts of the Mg, the Y and the Mn in Tables 4 to 6 correspond to converted amounts based on oxide. That is, they are indicated by the molar ratios of the MgO, the $Y_2O_3$ and the MnO respectively. "Average grain size of crystal grains of the dielectric ceramic" in Tables 4 to 6 refers to the average grain size of crystal grains of the dielectric ceramic containing the barium titanate as a main component. Moreover, "the absolute value of temperature coefficient of relative dielectric constant" in Tables 4 to 6 refers to the absolute value of the average value of the temperature coefficients in relative dielectric constant measured as described above. In the "Temperature Dependence Curve of Er" column of temperature changes of relative dielectric constant in Tables 4 to 6, entries marked with "○" represent samples in which two peaks were found centered on 25° C., while entries not marked with "○" represent samples in which two peaks were not found centered on 25° C.

In the "polarized charge" column in Tables 4 to 6, entries with no "○" represent samples whose polarization charge is not 20 $nC/cm^2$ or less.

TABLE 4

| Sample No. | Composition | | | | | $Ta_2O_5$ parts by mass | Average Crystal Grain Size µm | Relative Dielectric Constant ($\epsilon_r$) | | Absolute Value of Temperature Coefficient of εr 25 to 125° C. ×10⁻⁶/° C. | Temperature Dependence Curve of εr ○: Two Peaks observed | Polarized Charge ○: 20 nC/cm² or under |
|---|---|---|---|---|---|---|---|---|---|---|---|---|
| | Ba | MgO | $Y_2O_3$ | MnO | Ti | | | 25° C. | 125° C. | | | |
| 1 | 1 | 0.020 | 0.01 | 0.01 | 0.98 | 7.8 | 0.4 | 1157 | 549 | 5255 | | |
| 2 | 1 | 0.020 | 0.01 | 0.01 | 0.98 | 10.4 | 0.2 | 620 | 560 | 968 | ○ | |
| 3 | 1 | 0.020 | 0.01 | 0.01 | 0.98 | 15.6 | 0.18 | 360 | 347 | 361 | ○ | ○ |
| 4 | 1 | 0.020 | 0.01 | 0.01 | 0.98 | 20.8 | 0.17 | 252 | 246 | 200 | ○ | ○ |
| 5 | 1 | 0.020 | 0.01 | 0.01 | 0.98 | 26.1 | 0.15 | 210 | 205 | 178 | ○ | |
| 6 | 1 | 0.020 | 0.01 | 0.01 | 0.98 | 36.5 | 0.15 | 177 | 172 | 282 | | |
| 7 | 1 | 0.020 | 0.0002 | 0.01 | 0.98 | 15.5 | 0.4 | 512 | 438 | 1445 | | |
| 8 | 1 | 0.020 | 0.0015 | 0.01 | 0.98 | 15.5 | 0.2 | 447 | 404 | 962 | ○ | |

TABLE 4-continued

| | Composition | | | | | Avarage Crystal Grain Size μm | Relative Dielectric Constant ($\epsilon_r$) | | Abusolute Value of Temperature Coefficient of $\epsilon r$ | Temperature Dependence Curve of $\epsilon r$ | Poralized Charge |
|---|---|---|---|---|---|---|---|---|---|---|---|
| | | | | | $Ta_2O_5$ parts by mass | | 25° C. | 125° C. | 25 to 125° C. | ○: Two Peaks | ○: 20 nC/cm² |
| Sample No. | Molar ratios with respect to Ba | | | | | | | | | observed | or under |
| | Ba | MgO | $Y_2O_3$ | MnO | Ti | | | — | — | ×10⁻⁶/° C. | | |
| 9  | 1 | 0.020 | 0.005  | 0.01   | 0.98 | 15.5 | 0.17 | 433 | 412 | 485  | ○ | ○ |
| 10 | 1 | 0.020 | 0.03   | 0.01   | 0.98 | 16.0 | 0.08 | 291 | 272 | 653  | ○ | |
| 11 | 1 | 0.020 | 0.04   | 0.01   | 0.98 | 16.1 | 0.20 | 188 | 177 | 295  |   | |
| 12 | 1 | 0.005 | 0.01   | 0.01   | 0.98 | 15.4 | 0.17 | 511 | 430 | 1585 |   | |
| 13 | 1 | 0.01  | 0.01   | 0.01   | 0.98 | 15.5 | 0.15 | 450 | 408 | 933  | ○ | |
| 14 | 1 | 0.017 | 0.01   | 0.01   | 0.98 | 15.6 | 0.15 | 437 | 417 | 458  | ○ | ○ |
| 15 | 1 | 0.023 | 0.01   | 0.01   | 0.98 | 15.7 | 0.16 | 302 | 289 | 430  | ○ | ○ |
| 16 | 1 | 0.060 | 0.01   | 0.01   | 0.98 | 16.3 | 0.15 | 291 | 279 | 412  | ○ | ○ |
| 17 | 1 | 0.070 | 0.01   | 0.01   | 0.98 | 16.5 | 0.20 | 181 | 179 | 110  |   | |
| 18 | 1 | 0.020 | 0.01   | 0.0002 | 0.98 | 15.5 | 0.19 | 268 | 245 | 858  | ○ | |
| 19 | 1 | 0.020 | 0.01   | 0.005  | 0.98 | 15.5 | 0.14 | 261 | 244 | 651  | ○ | |
| 20 | 1 | 0.020 | 0.01   | 0.008  | 0.98 | 15.6 | 0.18 | 258 | 243 | 581  | ○ | |
| 21 | 1 | 0.020 | 0.01   | 0.015  | 0.98 | 15.7 | 0.19 | 253 | 242 | 435  | ○ | ○ |
| 22 | 1 | 0.020 | 0.01   | 0.03   | 0.98 | 16.0 | 0.18 | 250 | 240 | 400  | ○ | ○ |
| 23 | 1 | 0.020 | 0.01   | 0.04   | 0.98 | 16.1 | 0.18 | 159 | 148 | 692  |   | |
| 24 | 1 | 0.020 | 0.01   | 0.01   | 0.97 | 15.6 | 0.18 | 251 | 241 | 398  | ○ | ○ |
| 25 | 1 | 0.020 | 0.01   | 0.01   | 0.98 | 15.6 | 0.16 | 245 | 232 | 531  | ○ | |
| 26 | 1 | 0.020 | 0.01   | 0      | 0.98 | 15.5 | 0.14 | 285 | 255 | 1053 | ○ | |
| 27 | 1 | 0.020 | 0.03   | 0.01   | 0.98 | 16.0 | 0.05 | 205 | 188 | 829  | ○ | |
| 28 | 1 | 0.020 | 0.03   | 0.01   | 0.98 | 16.0 | 0.04 | 179 | 166 | 726  |   | |
| 29 | 1 | 0.020 | 0.01   | 0.01   | 0.98 | 10.4 | 0.28 | 988 | 880 | 1093 |   | |
| 30 | 1 | 0.020 | 0.01   | 0.01   | 0.98 | 15.6 | 0.18 | 355 | 342 | 366  | ○ | ○ |
| 31 | 1 | 0.020 | 0.01   | 0.01   | 0.98 | 15.6 | 0.18 | 351 | 335 | 456  | ○ | ○ |
| 32 | 1 | 0.020 | 0.0007 | 0.01   | 0.98 | 15.5 | 0.20 | 460 | 416 | 957  | ○ | |

TABLE 5

| | Composition | | | | | Ratios with respect to 100 parts by mass of $BaTiO_3$ | | | Avarage Crystal Grain Size mm | Relative Dielectric Constant ($\epsilon_r$) | | Abusolute Value of Temperature Coefficient of $\epsilon_r$ | Temperature Dependence Curve of $\epsilon_r$ | Poralized Charge |
|---|---|---|---|---|---|---|---|---|---|---|---|---|---|---|
| | | | | | | $Ta_2O_5$ | $SiO_2$ | $B_2O_3$ | | 25° C. | 125° C. | 25 to 125° C. | ○: Two Peaks | ○: 20 nC/cm² |
| Sample No. | Molar ratios with respect to Ba | | | | | | | | | | | | observed | or under |
| | Ba | MgO | $Y_2O_3$ | MnO | Ti | parts by mass | | | | — | — | ×10⁻⁶/° C. | | |
| 33 | 1 | 0.020 | 0.010  | 0.010 | 0.980 | 7.8  | 1.56 | 0.52 | 0.40 | 1055 | 595 | 4360 |   | |
| 34 | 1 | 0.020 | 0.010  | 0.010 | 0.980 | 10.4 | 1.56 | 0.52 | 0.20 | 495  | 447 | 970  | ○ | |
| 35 | 1 | 0.020 | 0.010  | 0.010 | 0.980 | 12.1 | 1.56 | 0.52 | 0.18 | 406  | 375 | 754  | ○ | |
| 36 | 1 | 0.020 | 0.010  | 0.010 | 0.980 | 14.0 | 1.56 | 0.52 | 0.17 | 362  | 337 | 702  | ○ | ○ |
| 37 | 1 | 0.020 | 0.010  | 0.010 | 0.980 | 15.6 | 1.56 | 0.52 | 0.15 | 350  | 330 | 565  | ○ | ○ |
| 38 | 1 | 0.020 | 0.010  | 0.010 | 0.980 | 19.2 | 1.56 | 0.52 | 0.15 | 343  | 320 | 671  | ○ | ○ |
| 39 | 1 | 0.020 | 0.010  | 0.010 | 0.980 | 23.6 | 1.56 | 0.52 | 0.15 | 331  | 310 | 634  | ○ | |
| 40 | 1 | 0.020 | 0.010  | 0.010 | 0.980 | 26.1 | 1.56 | 0.52 | 0.15 | 203  | 186 | 851  | ○ | |
| 41 | 1 | 0.020 | 0.010  | 0.010 | 0.980 | 36.5 | 1.56 | 0.52 | 0.15 | 177  | 158 | 897  |   | |
| 42 | 1 | 0.020 | 0.0002 | 0.010 | 0.980 | 15.4 | 1.55 | 0.52 | 0.40 | 406  | 348 | 1425 |   | |
| 43 | 1 | 0.020 | 0.0007 | 0.010 | 0.980 | 15.4 | 1.55 | 0.52 | 0.20 | 377  | 344 | 867  | ○ | |
| 44 | 1 | 0.020 | 0.0015 | 0.010 | 0.980 | 15.4 | 1.55 | 0.52 | 0.18 | 363  | 340 | 633  | ○ | ○ |
| 45 | 1 | 0.020 | 0.005  | 0.010 | 0.980 | 15.4 | 1.55 | 0.52 | 0.17 | 360  | 338 | 611  | ○ | ○ |
| 46 | 1 | 0.020 | 0.007  | 0.010 | 0.980 | 15.5 | 1.56 | 0.52 | 0.17 | 352  | 330 | 621  | ○ | |
| 47 | 1 | 0.020 | 0.030  | 0.010 | 0.980 | 15.9 | 1.60 | 0.53 | 0.10 | 286  | 261 | 874  | ○ | |
| 48 | 1 | 0.020 | 0.040  | 0.010 | 0.980 | 16.0 | 1.61 | 0.54 | 0.10 | 178  | 169 | 506  |   | |
| 49 | 1 | 0.005 | 0.010  | 0.010 | 0.980 | 15.3 | 1.54 | 0.51 | 0.20 | 406  | 358 | 1188 |   | |
| 50 | 1 | 0.010 | 0.010  | 0.010 | 0.980 | 15.4 | 1.55 | 0.52 | 0.20 | 343  | 310 | 971  | ○ | |
| 51 | 1 | 0.017 | 0.010  | 0.010 | 0.980 | 15.5 | 1.56 | 0.52 | 0.16 | 332  | 309 | 699  | ○ | ○ |
| 52 | 1 | 0.023 | 0.010  | 0.010 | 0.980 | 15.6 | 1.57 | 0.52 | 0.15 | 300  | 280 | 667  | ○ | ○ |
| 53 | 1 | 0.040 | 0.010  | 0.010 | 0.980 | 15.9 | 1.60 | 0.53 | 0.10 | 266  | 248 | 679  | ○ | ○ |
| 54 | 1 | 0.060 | 0.010  | 0.010 | 0.980 | 16.2 | 1.63 | 0.54 | 0.10 | 200  | 181 | 965  | ○ | |
| 55 | 1 | 0.070 | 0.010  | 0.010 | 0.980 | 16.4 | 1.65 | 0.55 | 0.14 | 183  | 179 | 219  |   | |
| 56 | 1 | 0.020 | 0.010  | 0.005 | 0.980 | 15.4 | 1.55 | 0.52 | 0.20 | 251  | 228 | 916  | ○ | |
| 57 | 1 | 0.020 | 0.010  | 0.008 | 0.980 | 15.5 | 1.56 | 0.52 | 0.19 | 248  | 227 | 847  | ○ | |
| 58 | 1 | 0.020 | 0.010  | 0.013 | 0.980 | 15.6 | 1.57 | 0.52 | 0.18 | 247  | 229 | 729  | ○ | ○ |
| 59 | 1 | 0.020 | 0.010  | 0.015 | 0.980 | 15.6 | 1.57 | 0.52 | 0.18 | 243  | 226 | 700  | ○ | ○ |
| 60 | 1 | 0.020 | 0.010  | 0.030 | 0.980 | 15.9 | 1.60 | 0.53 | 0.16 | 232  | 217 | 647  | ○ | ○ |
| 61 | 1 | 0.020 | 0.010  | 0.040 | 0.980 | 16.0 | 1.61 | 0.54 | 0.14 | 153  | 133 | 1307 |   | |
| 62 | 1 | 0.020 | 0.010  | 0.010 | 0.970 | 15.5 | 1.56 | 0.52 | 0.14 | 322  | 302 | 621  | ○ | ○ |

TABLE 5-continued

| | | | | | | Composition | | | | Relative Dielectric Constant ($e_r$) | | Absolute Value of Temperature Coefficient of $e_r$ | Temperature Dependence Curve of $e_r$ | Poralized Charge |
|---|---|---|---|---|---|---|---|---|---|---|---|---|---|---|
| | | | | | | Ratios with respect to 100 parts by mass of BaTiO$_3$ | | | Avarage Crystal Grain | | | | | |
| Sample | Molar ratios with respect to Ba | | | | | Ta$_2$O$_5$ | SiO$_2$ | B$_2$O$_3$ | Size | 25° C. | 125° C. | 25 to 125° C. | o: Two Peaks | o: 20 nC/cm$^2$ |
| No. | Ba | MgO | Y$_2$O$_3$ | MnO | Ti | parts by mass | | | mm | — | — | ×10$^{-6}$/° C. | observed | or under |
| 63 | 1 | 0.020 | 0.010 | 0.010 | 0.990 | 15.5 | 1.56 | 0.52 | 0.15 | 351 | 322 | 826 | o | |
| 64 | 1 | 0.020 | 0.010 | 0 | 0.980 | 15.4 | 1.55 | 0.52 | 0.20 | 382 | 342 | 1047 | | |
| 65 | 1 | 0.020 | 0.010 | 0.010 | 0.980 | 15.5 | 0.73 | 0.31 | 0.15 | 354 | 332 | 633 | o | o |
| 66 | 1 | 0.020 | 0.010 | 0.010 | 0.980 | 15.5 | 2.61 | 0.52 | 0.15 | 329 | 306 | 692 | o | o |
| 67 | 1 | 0.020 | 0.010 | 0.010 | 0.980 | 15.5 | 3.13 | 1.04 | 0.15 | 262 | 244 | 695 | o | o |
| 68 | 1 | 0.020 | 0.010 | 0.010 | 0.980 | 15.5 | 4.69 | 1.56 | 0.15 | 228 | 208 | 891 | o | |
| 69 | 1 | 0.020 | 0.010 | 0.010 | 0.980 | 15.5 | 6.3 | 2.1 | 0.15 | 205 | 190 | 732 | o | |
| 70 | 1 | 0.020 | 0.030 | 0.010 | 0.980 | 15.9 | 1.60 | 0.53 | 0.05 | 204 | 190 | 686 | o | |
| 71 | 1 | 0.020 | 0.030 | 0.010 | 0.980 | 15.9 | 1.60 | 0.53 | 0.04 | 173 | 160 | 726 | o | |
| 72 | 1 | 0.020 | 0.010 | 0.010 | 0.980 | 15.5 | 1.56 | 0.52 | 0.28 | 716 | 499 | 3034 | | |

TABLE 6

| | | | | | | Composition | | | | Relative Dielectric Constant (er) | | Abusolute Valure of Temperature Coefficient of er | Temperature Dependence Curve of er | Poralized Charge |
|---|---|---|---|---|---|---|---|---|---|---|---|---|---|---|
| | | | | | | Ratios with respect to 100 parts by mass of BaTiO$_3$ | | | Avarage Crystal Grain | | | | | |
| Sample | Molar ratios with respect to Ba | | | | | Yb$_2$O$_3$ | SiO$_2$ | Li$_2$O | Size | 25° C. | 125° C. | 25 to 125° C. | o: Two Peaks | o: 20 nC/cm$^2$ |
| No. | Ba | MgO | Y$_2$O$_3$ | MnO | Ti | parts by mass | | | mm | — | — | ×10$^{-6}$/° C. | observed | or less |
| 73 | 1 | 0.020 | 0.010 | 0.010 | 0.980 | 7.8 | 1.56 | 0.52 | 0.40 | 1043 | 595 | 4298 | | |
| 74 | 1 | 0.020 | 0.010 | 0.010 | 0.980 | 10.4 | 1.56 | 0.52 | 0.20 | 496 | 447 | 994 | o | |
| 75 | 1 | 0.020 | 0.010 | 0.010 | 0.980 | 12.1 | 1.56 | 0.52 | 0.18 | 414 | 375 | 927 | o | |
| 76 | 1 | 0.020 | 0.010 | 0.010 | 0.980 | 14.0 | 1.56 | 0.52 | 0.17 | 362 | 337 | 699 | o | o |
| 77 | 1 | 0.020 | 0.010 | 0.010 | 0.980 | 15.6 | 1.56 | 0.52 | 0.15 | 351 | 330 | 585 | o | o |
| 78 | 1 | 0.020 | 0.010 | 0.010 | 0.980 | 19.2 | 1.56 | 0.52 | 0.15 | 343 | 320 | 680 | o | o |
| 79 | 1 | 0.020 | 0.010 | 0.010 | 0.980 | 23.6 | 1.56 | 0.52 | 0.15 | 340 | 310 | 872 | o | |
| 80 | 1 | 0.020 | 0.010 | 0.010 | 0.980 | 26.1 | 1.56 | 0.52 | 0.15 | 203 | 186 | 851 | o | |
| 81 | 1 | 0.020 | 0.010 | 0.010 | 0.980 | 36.5 | 1.56 | 0.52 | 0.15 | 177 | 161 | 897 | | |
| 82 | 1 | 0.020 | 0.0002 | 0.010 | 0.980 | 15.4 | 1.55 | 0.52 | 0.40 | 406 | 348 | 1425 | | |
| 83 | 1 | 0.020 | 0.0007 | 0.010 | 0.980 | 15.4 | 1.55 | 0.52 | 0.20 | 377 | 344 | 867 | o | |
| 84 | 1 | 0.020 | 0.0015 | 0.010 | 0.980 | 15.4 | 1.55 | 0.52 | 0.18 | 363 | 340 | 633 | o | o |
| 85 | 1 | 0.020 | 0.005 | 0.010 | 0.980 | 15.4 | 1.55 | 0.52 | 0.17 | 360 | 338 | 611 | o | o |
| 86 | 1 | 0.020 | 0.007 | 0.010 | 0.980 | 15.5 | 1.56 | 0.52 | 0.17 | 352 | 330 | 621 | o | o |
| 87 | 1 | 0.020 | 0.030 | 0.010 | 0.980 | 15.9 | 1.60 | 0.53 | 0.10 | 285 | 260 | 877 | o | |
| 88 | 1 | 0.020 | 0.040 | 0.010 | 0.980 | 16.0 | 1.61 | 0.54 | 0.10 | 179 | 171 | 447 | | |
| 89 | 1 | 0.005 | 0.010 | 0.010 | 0.980 | 15.3 | 1.54 | 0.51 | 0.20 | 406 | 358 | 1188 | | |
| 90 | 1 | 0.010 | 0.010 | 0.010 | 0.980 | 15.4 | 1.55 | 0.52 | 0.20 | 343 | 310 | 971 | o | |
| 91 | 1 | 0.017 | 0.010 | 0.010 | 0.980 | 15.5 | 1.56 | 0.52 | 0.16 | 332 | 309 | 699 | o | o |
| 92 | 1 | 0.023 | 0.010 | 0.010 | 0.980 | 15.6 | 1.57 | 0.52 | 0.15 | 300 | 280 | 667 | o | o |
| 93 | 1 | 0.040 | 0.010 | 0.010 | 0.980 | 15.9 | 1.60 | 0.53 | 0.10 | 266 | 248 | 679 | o | o |
| 94 | 1 | 0.060 | 0.010 | 0.010 | 0.980 | 16.2 | 1.63 | 0.54 | 0.10 | 200 | 181 | 965 | o | |
| 95 | 1 | 0.070 | 0.010 | 0.010 | 0.980 | 16.4 | 1.65 | 0.55 | 0.14 | 180 | 177 | 167 | | |
| 96 | 1 | 0.020 | 0.010 | 0.005 | 0.980 | 15.4 | 1.55 | 0.52 | 0.20 | 250 | 229 | 840 | o | |
| 97 | 1 | 0.020 | 0.010 | 0.008 | 0.980 | 15.5 | 1.56 | 0.52 | 0.19 | 248 | 229 | 766 | o | |
| 98 | 1 | 0.020 | 0.010 | 0.013 | 0.980 | 15.6 | 1.57 | 0.52 | 0.18 | 244 | 229 | 615 | o | o |
| 99 | 1 | 0.020 | 0.010 | 0.015 | 0.980 | 15.6 | 1.57 | 0.52 | 0.18 | 242 | 227 | 620 | o | o |
| 100 | 1 | 0.020 | 0.010 | 0.030 | 0.980 | 15.9 | 1.60 | 0.53 | 0.16 | 231 | 218 | 563 | o | o |
| 101 | 1 | 0.020 | 0.010 | 0.040 | 0.980 | 16.0 | 1.61 | 0.54 | 0.14 | 150 | 132 | 1200 | | |
| 102 | 1 | 0.020 | 0.010 | 0.010 | 0.970 | 15.5 | 1.56 | 0.52 | 0.14 | 321 | 301 | 623 | o | o |
| 103 | 1 | 0.020 | 0.010 | 0.010 | 0.990 | 15.5 | 1.56 | 0.52 | 0.15 | 350 | 320 | 850 | o | |
| 104 | 1 | 0.020 | 0.010 | 0 | 0.980 | 15.4 | 1.55 | 0.52 | 0.20 | 381 | 341 | 1051 | | |
| 105 | 1 | 0.020 | 0.010 | 0.010 | 0.980 | 15.5 | 0.73 | 0.31 | 0.15 | 354 | 332 | 633 | o | o |
| 106 | 1 | 0.020 | 0.010 | 0.010 | 0.980 | 15.5 | 2.61 | 0.52 | 0.15 | 329 | 306 | 692 | o | o |
| 107 | 1 | 0.020 | 0.010 | 0.010 | 0.980 | 15.5 | 3.13 | 1.04 | 0.15 | 262 | 244 | 695 | o | o |
| 108 | 1 | 0.020 | 0.010 | 0.010 | 0.980 | 15.5 | 4.69 | 1.56 | 0.15 | 228 | 208 | 891 | o | |
| 109 | 1 | 0.020 | 0.010 | 0.010 | 0.980 | 15.5 | 6.3 | 2.1 | 0.15 | 205 | 190 | 732 | o | |
| 110 | 1 | 0.020 | 0.030 | 0.010 | 0.980 | 15.9 | 1.60 | 0.53 | 0.05 | 200 | 183 | 850 | o | |
| 111 | 1 | 0.020 | 0.030 | 0.010 | 0.980 | 15.9 | 1.60 | 0.53 | 0.04 | 173 | 160 | 726 | o | |
| 112 | 1 | 0.020 | 0.010 | 0.010 | 0.980 | 15.5 | 1.56 | 0.52 | 0.28 | 716 | 580 | 1904 | o | |

Tables 1 and 4 indicate that in samples Nos. 2 to 5, 8 to 10, 13 to 16, 18 to 22, 24, 25, 27 and 30 to 32, the relative dielectric constant at 25° C. is 205 or more, the relative dielectric constant at 125° C. is 188 or more, and the temperature coefficient in relative dielectric constant in a temperature range from 25° to 125° C. is $968 \times 10^{-6}$/° C. or less as the absolute value.

In particular, samples Nos. 3, 4, 9, 14 to 16, 21, 22, 24, 30 and 31 include 0.017 to 0.06 of the molar ratio of the MgO with respect to Ba, 0.005 to 0.01 of the molar ratio of the $Y_2O_3$ with respect to Ba and 0.01 to 0.03 of the molar ratio of the MnO with respect to Ba, and the content of the $Ta_2O_5$ is 15.6 to 20.8 parts by mass with respect to 100 parts by mass of the barium titanate as a main component, and the titanium molar ratio over 1 mole of barium is 0.97 to 0.98. In these samples, the relative dielectric constant at 25° C. is 250 or more, the relative dielectric constant at 125° C. is 240 or more, the temperature coefficient in relative dielectric constant in a temperature range from 25° C. to 125° C. is $500 \times 10^{-6}$/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. Samples having no large hysteresis had a polarization charge of 20 nC/cm² or less at 0V.

Figure 2:
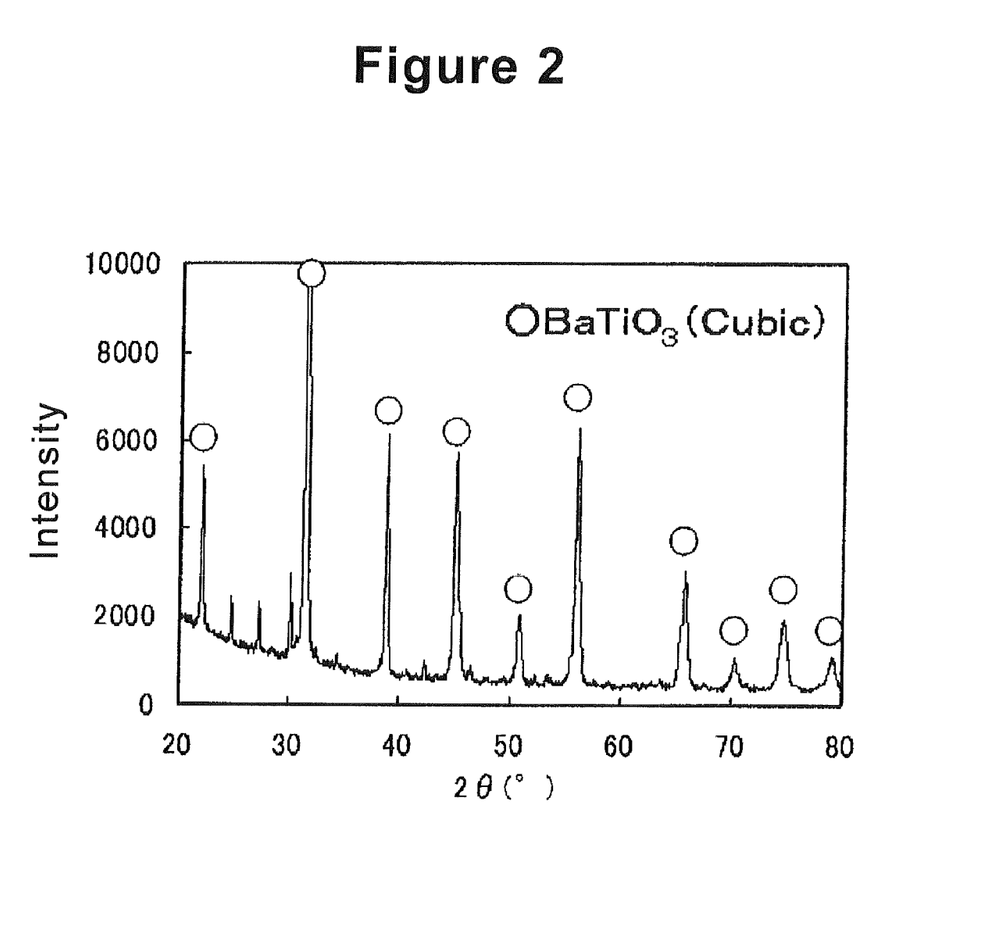
FIG. 2 illustrates a graph showing an exemplary X-ray diffraction pattern of sample No. 3 in the EXAMPLE.
Figure 3:
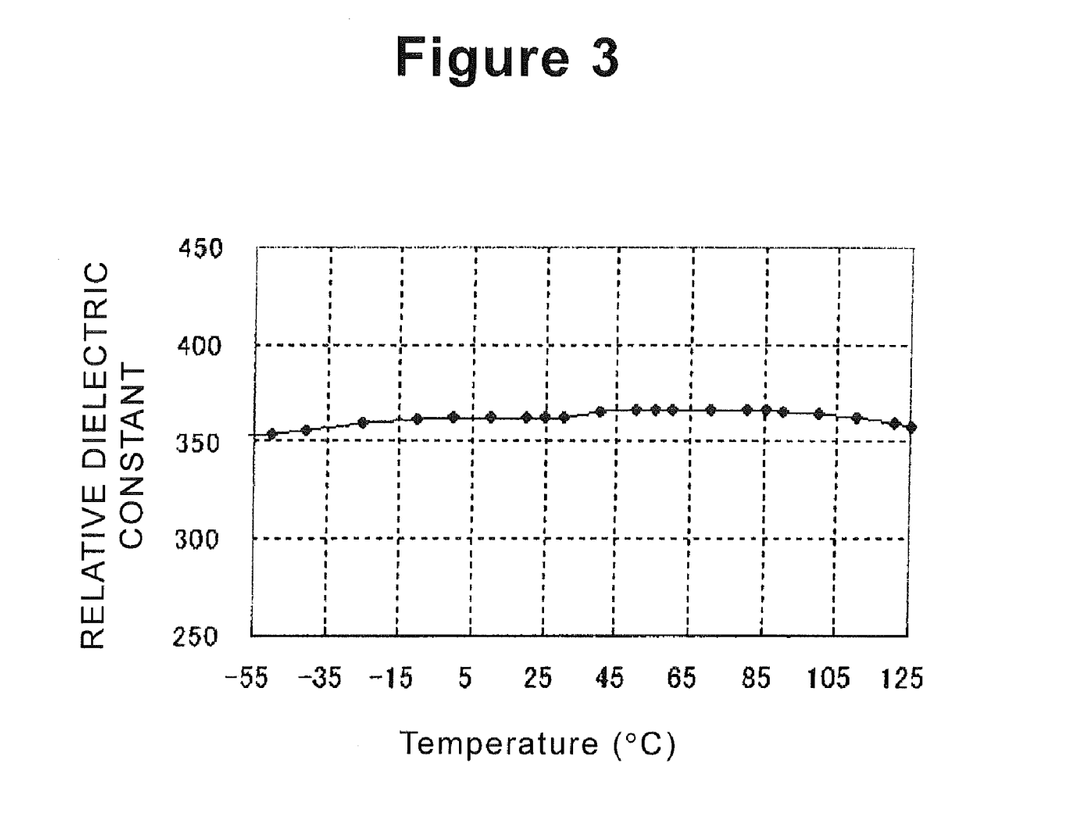
FIG. 3 is a graph showing relative dielectric constants of sample No. 3 in the EXAMPLE.
Figure 4:
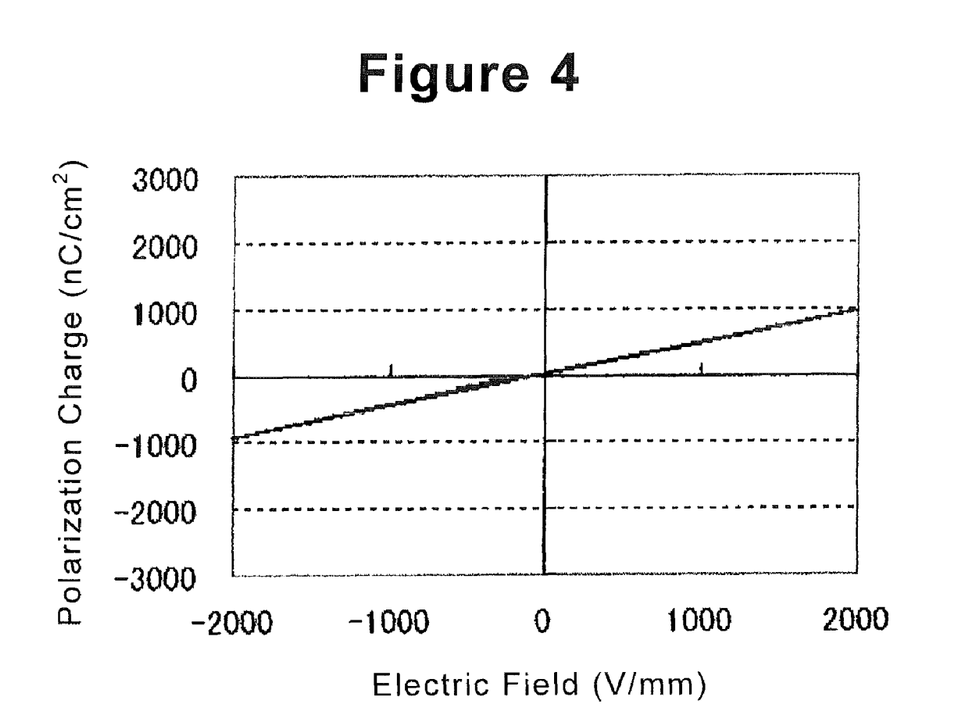
FIG. 4 is a graph showing a characteristic of dielectric polarization (V-Q) of sample No. 3 in the EXAMPLE.

FIG. 2 shows an X-ray diffraction pattern of a dielectric ceramic derived from sample No. 4 which was arbitrarily selected from the samples mentioned above. FIG. 3 shows the relative dielectric constant of the sample No. 4. FIG. 4 shows the electric-field versus dielectric polarization characteristic of the sample No. 4.

As shown in FIGS. 2 to 4, the dielectric ceramic of sample No. 4 has the crystal structure mainly comprising a cubic system, the temperature characteristic in relative dielectric constant has two peaks centered at 25° C., the rate of change in relative dielectric constant was small, and the hysteresis in electric-field versus dielectric polarization characteristic was small. In the same manner, the other samples mentioned above had a crystal structure mainly comprising a cubic system and also had a small rate of change in relative dielectric constant.

In contrast, in samples Nos. 1, 6, 7, 11, 12, 17, 23, 26, 28 and 29, the relative dielectric constant at 25° C. was less than 200 and/or absolute values of the temperature coefficient in relative dielectric constant were greater than $1000 \times 10^{-6}$/° C.

Tables 2 and 5 indicates that in samples of Nos. 34 to 40, 43 to 47, 50 to 54, 56 to 60, 62, 63, and 65 to 72, the relative dielectric constant at 25° C. is 200 or more, the relative dielectric constant at 125° C. is 180 or more, and the temperature coefficient in relative dielectric constant in a range from 25° C. to 125° C. is $1000 \times 10^{-6}$/° C. or less as the absolute value.

In particular, sample Nos. 36 to 38, 44 to 46, 51 to 53, 58 to 60, 62, and 65 to 67 include 0.017 to 0.04 mole of MgO, 0.0015 to 0.01 mole of $Y_2O_3$ and 0.01 to 0.03 mole of MnO per 1 mole of Ba, and the content of $Ta_2O_5$ is 14.0 to 19.2 parts by mass, the content of $SiO_2$ is 0.73 to 3.13 parts by mass and the content of $B_2O_3$ is 0.31 to 1.04 parts by mass with respect to 100 parts by mass of barium titanate as a main component, and the titanium molar ratio over 1 mole of barium is 0.97 to 0.98. In these samples, the relative dielectric constant at 25° C. is 230 or more, the relative dielectric constant at 125° C. is 215 or more, the temperature coefficient in relative dielectric constant in a temperature range from 25° C. to 125° C. is $730 \times 10^{-6}$/° C. or less as the absolute value and the curve indicating the rate of change in relative dielectric constant had two peaks in a temperature range from −55° C. to 125° C. No large hysteresis was observed in the measurements of electric-field versus dielectric polarization characteristic for these samples. Those samples having no large hysteresis had a polarization charge of 20 nC/cm² or less at 0V.

Figure 5:
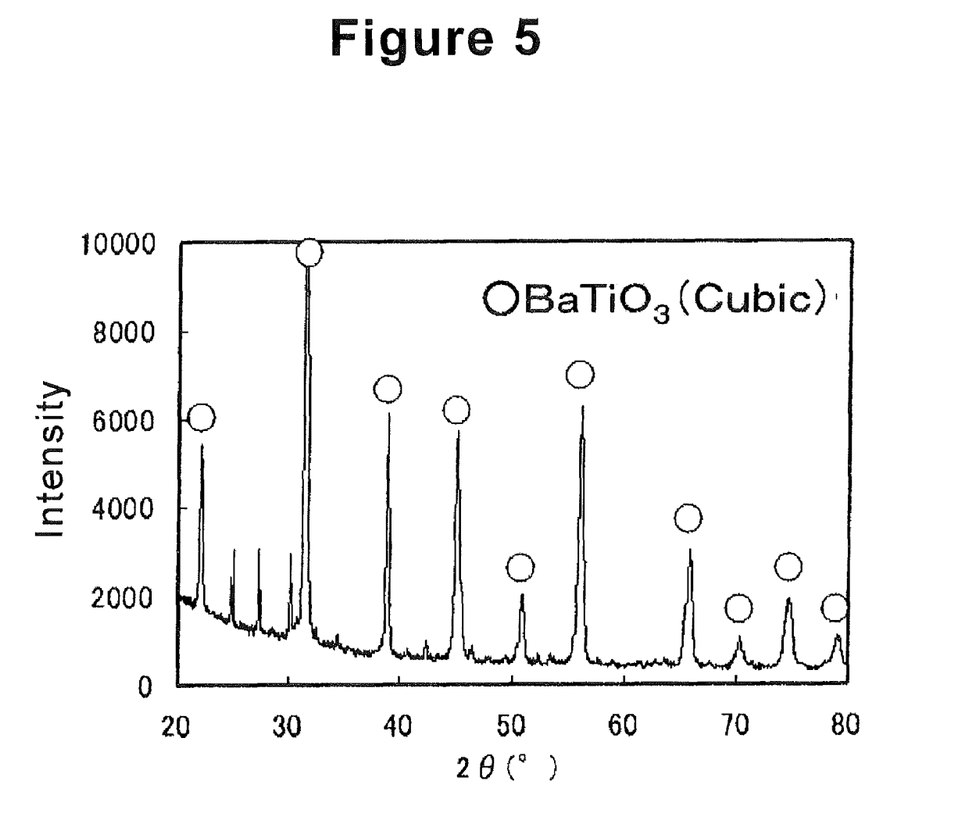
FIG. 5 is a graph showing an X-ray diffraction pattern of sample No. 36 in the EXAMPLE.
Figure 6:
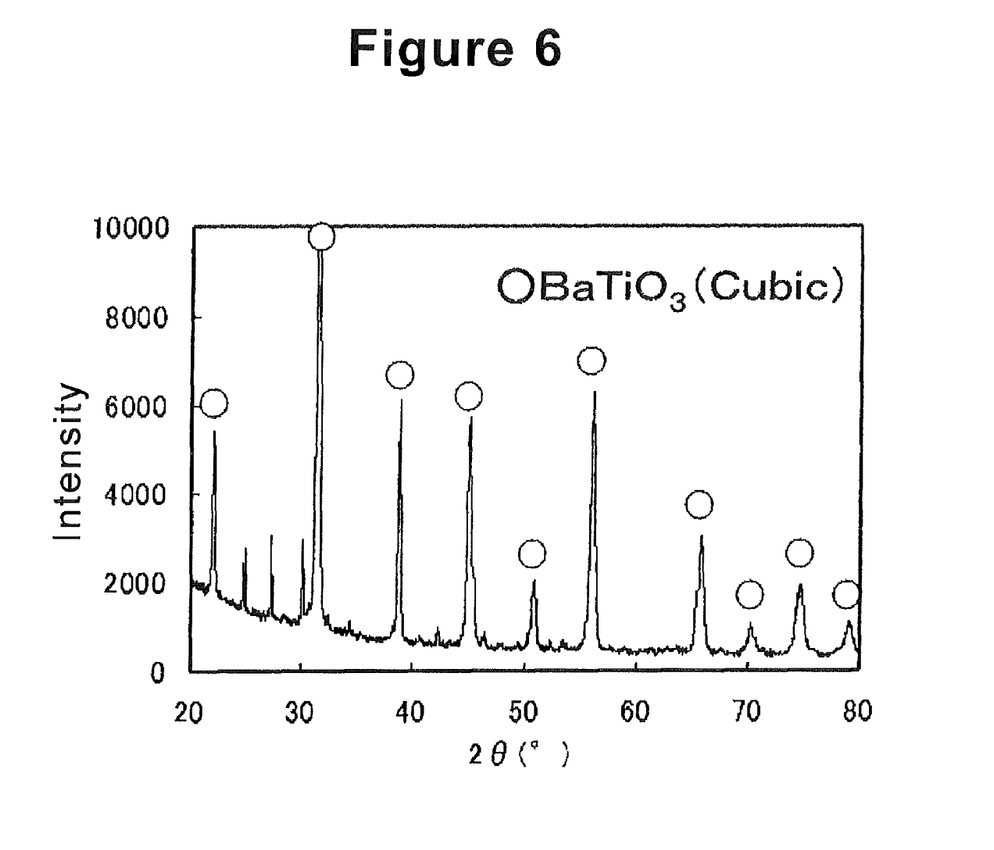
FIG. 6 is a graph showing an X-ray diffraction pattern of sample No. 76 in the EXAMPLE.

FIG. 5 shows an X-ray diffraction pattern of a dielectric ceramic derived from sample No. 36 which was arbitrarily selected from these samples. FIG. 6 shows the change in relative dielectric constant of the sample No. 36. FIG. 7 shows the electric-field versus dielectric polarization characteristic of the sample No. 36.

As shown in FIGS. 5 to 7, the dielectric ceramic of sample No. 36 has the crystal structure mainly comprising a cubic system, the temperature characteristic in relative dielectric constant has two peaks centered at 25° C., the rate of change in relative dielectric constant was small, and the hysteresis in electric-field versus dielectric polarization characteristic was small. In the same manner, the other samples mentioned above had a crystal structure mainly comprising a cubic system and also had a small rate of change in relative dielectric constant.

In contrast, in sample Nos. 33, 41, 42, 48, 49, 55 and 61, the relative dielectric constant at 25° C. was less than 200 and/or absolute values of the temperature coefficient in relative dielectric constant were greater than $1047 \times 10^{-6}$/° C.

Tables 3 and 6 indicate that in sample Nos. 74 to 80, 83 to 87, 90 to 94, 96 to 100, 102, 103, and 105 to 110, the relative dielectric constant at 25° C. is 200 or more, the relative dielectric constant at 125° C. is 180 or more, and the temperature coefficient in relative dielectric constant in a temperature range from 25° C. to 125° C. is $1000 \times 10^{-6}$/° C. or less as the absolute value.

In particular, samples Nos. 76 to 78, 84 to 86, 91 to 93, 98 to 100, 102 and 105 to 107 include 0.017 to 0.04 mole of MgO, 0.0015 to 0.01 mole of $Y_2O_3$ and 0.01 to 0.03 mole of MnO per 1 mole of Ba, and the content of $Ta_2O_5$ is 14.0 to 19.2 parts by mass, the content of $SiO_2$ is 0.73 to 3.13 parts by mass and the content of $Li_2O$ is 0.31 to 1.04 parts by mass with respect to 100 parts by mass of barium titanate as a main component, and the titanium molar ratio over 1 mole of barium is 0.97 to 0.98. In these samples, the relative dielectric constant at 25° C. is 230 or more, the relative dielectric constant at 125° C. is 215 or more, the temperature coefficient in relative dielectric constant in a range from 25° C. to 125° C. is $700 \times 10^{-6}$/° C. or less as the absolute value and the curve indicating the rate of change in relative dielectric constant had two peaks in a temperature range from −55° C. to 125° C. No large hysteresis was found in the measurements of electric-field versus dielectric polarization characteristic for these samples. Those samples having no hysteresis had a polarization charge of 20 nC/cm² or less at 0V.

FIG. 8 shows an X-ray diffraction pattern of a dielectric ceramic derived from sample No. 76 which was arbitrarily selected from these samples. FIG. 9 shows the change in relative dielectric constant of the sample No. 76. FIG. 10 shows the electric-field versus dielectric polarization characteristic of the sample No. 76.

As shown in FIGS. 8 to 10, the dielectric ceramic of sample No. 76 has the crystal structure mainly comprising a cubic system, the temperature characteristic in relative dielectric constant has two peaks centered at 25° C., the rate of change in relative dielectric constant was small, and the hysteresis in electric-field versus dielectric polarization characteristic was small. In the same manner, the other samples mentioned above had a crystal structure mainly comprising a cubic system and also had a small rate of change in relative dielectric constant.

In the sample Nos. 73, 81 82, 88, 89, 95, 101 and 104, the relative dielectric constant at 25° C. was less than 200 and/or absolute values of the temperature coefficient in relative dielectric constant was $1051 \times 10^{-6}$/° C. or more.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A dielectric ceramic, comprising:
   barium titanate;
   magnesium, a molar ratio of the magnesium to the barium in the dielectric ceramic is in a range of 0.01 to 0.06;
   yttrium, a molar ratio of the yttrium to the barium in the dielectric ceramic is in a range of 0.0014 to 0.06;
   manganese, a molar ratio of the manganese to the barium in the dielectric ceramic is in a range of 0.0002 to 0.03;
   tantalum, a mass ratio of the tantalum to the barium titanate is in a range of 10.4 to 26.1 parts by mass of $Ta_2O_5$ with respect to 100 parts by mass of the barium titanate; and
   a plurality of crystal grains comprising the barium titanate as a main component, wherein boundaries of the crystal grains are located between or among the crystal grains, and wherein an average diameter of the crystal grains is in a range of 0.05 µm to 0.2 µm.

2. The dielectric ceramic according to claim 1, wherein:
   the molar ratio of the magnesium to the barium in the dielectric ceramic is in a range of 0.017 to 0.06,
   the molar ratio of the yttrium to the barium in the dielectric ceramic is in a range of 0.01 to 0.02, and
   the molar ratio of the manganese to the barium in the dielectric ceramic is in a range of 0.01 to 0.03.

3. The dielectric ceramic according to claim 2, wherein the mass ratio of the tantalum to the barium titanate is in a range of 15.6 to 20.8 parts by the mass of the $Ta_2O_5$ with respect to 100 parts by the mass of the barium titanate.

4. The dielectric ceramic according to claim 3, wherein a molar ratio of titanium to barium is in a range of 0.97 to 0.98.

5. The dielectric ceramic according to claim 1, further comprising silicon, and boron, lithium or the combination thereof.

6. The dielectric ceramic according to claim 5, wherein:
   a mass ratio of the silicon to the barium titanate is in a range of 0.73 to 6.3 parts by mass of $SiO_2$ with respect to 100 parts by the mass of the barium titanate, and
   a mass ratio of total of the boron and the lithium to the barium titanate is in a range of 0.31 to 2.1 parts by mass of total of $B_2O_3$ and $Li_2O$ with respect to 100 parts by the mass of the barium titanate.

7. The dielectric ceramic according to claim 5, wherein:
   the molar ratio of the manganese to the barium in the dielectric ceramic is in a range of 0.005 to 0.03.

8. The dielectric ceramic according to claim 7, wherein:
   the molar ratio of the magnesium to the barium in the dielectric ceramic is in a range of 0.017 to 0.04,
   the molar ratio of the yttrium to the barium in the dielectric ceramic is in a range of 0.03 to 0.02, and
   the molar ratio of the manganese to the barium in the dielectric ceramic is in a range of 0.01 to 0.03.

9. The dielectric ceramic according to claim 8, wherein the mass ratio of the tantalum to the barium titanate is in a range of 14.0 to 19.2 parts by the mass of the $Ta_2O_5$ with respect to 100 parts by the mass of the barium titanate.

10. The dielectric ceramic according to claim 9, wherein:
    a mass ratio of the silicon to the barium titanate is in a range of 0.73 to 3.13 parts by mass of $SiO_2$ with respect to 100 parts by the mass of the barium titanate, and
    a mass ratio of total of the boron and the lithium to the barium titanate is in a range of 0.31 to 1.04 parts by mass of total of $B_2O_3$ and $Li_2O$ with respect to 100 parts by the mass of the barium titanate.

11. A capacitor comprising:
    a laminated body comprising a plurality of dielectric layers and a plurality of conductor layers, wherein each of the dielectric layers comprises the dielectric ceramic, the dielectric ceramic comprising:
    barium titanate;
    magnesium, a molar ratio of the magnesium to the barium in the dielectric ceramic is in a range of 0.01 to 0.06;

yttrium, a molar ratio of the yttrium to the barium in the dielectric ceramic is in a range of 0.0014 to 0.06;

manganese, a molar ratio of the manganese to the barium in the dielectric ceramic is in a range of 0.0002 to 0.03;

tantalum, a mass ratio of the tantalum to the barium titanate is in a range of 10.4 to 26.1 parts by mass of $Ta_2O_5$ with respect to 100 parts by mass of the barium titanate; and a plurality of crystal grains comprising the barium titanate as a main component, wherein grain boundaries of the crystal grains are located between or among the crystal grains, wherein an average diameter of the crystal grains is in a range of 0.05 μm to 0.2 μm.

12. The capacitor according to claim 11, wherein:
the molar ratio of the magnesium to the barium in the dielectric ceramic is in a range of 0.017 to 0.06,
the molar ratio of the yttrium to the barium in the dielectric ceramic is in a range of 0.01 to 0.02, and
the molar ratio of the manganese to the barium in the dielectric ceramic is in a range of 0.01 to 0.03.

13. The capacitor according to claim 12, wherein the mass ratio of the tantalum to the barium titanate is in a range of 15.6 to 20.8 parts by the mass of the $Ta_2O_5$ with respect to 100 parts by mass of the barium titanate.

14. The capacitor according to claim 13, wherein a molar ratio of titanium to barium is in a range of 0.97 to 0.98.

15. The capacitor according to claim 11, wherein:
the dielectric ceramic further comprises silicon, and boron, lithium or the combination thereof.

16. The capacitor according to claim 15, wherein:
a mass ratio of the silicon to the barium titanate is in a range of 0.73 to 6.3 parts by mass of $SiO_2$ with respect to 100 parts by the mass of the barium titanate, and
a mass ratio of total of the boron and the lithium to the barium titanate is in a range of 0.31 to 2.1 parts by mass of total of $B_2O_3$ and $Li_2O$ with respect to 100 parts by the mass of the barium titanate.

17. The dielectric ceramic according to claim 16, wherein:
the molar ratio of the manganese to the barium is in a range of 0.017 to 0.23.

18. The capacitor according to claim 17, wherein:
the molar ratio of the magnesium to the barium in the dielectric ceramic is in a range of 0.017 to 0.04,
the molar ratio of the yttrium to the barium in the dielectric ceramic is in a range of 0.03 to 0.02, and
the molar ratio of the manganese to the barium in the dielectric ceramic is in a range of 0.01 to 0.03.

19. The capacitor according to claim 18, wherein the mass ratio of the tantalum to the barium titanate is in a range of 14.0 to 19.2 parts by the mass of the $Ta_2O_5$ with respect to 100 parts by the mass of the barium titanate.

20. The capacitor according to claim 19, wherein:
a mass ratio of the silicon to the barium titanate is in a range of 0.73 to 3.13 parts by mass of $SiO_2$ with respect to 100 parts by the mass of the barium titanate, and
a mass ratio of total of the boron and the lithium to the barium titanate is in a range of 0.31 to 1.04 parts by mass of total of $B_2O_3$ and $Li_2O$ with respect to 100 parts by the mass of the barium titanate.

* * * * *